(12) United States Patent
Mansour et al.

(10) Patent No.: US 9,955,300 B2
(45) Date of Patent: Apr. 24, 2018

(54) METHOD FOR INCORPORATING INVISIBLE ACCESS POINTS FOR RSSI-BASED INDOOR POSITIONING APPLICATIONS

(71) Applicant: TEXAS INSTRUMENTS INCORPORATED, Dallas, TX (US)

(72) Inventors: Mohamed Farouk Mansour, Richardson, TX (US); Deric Wayne Waters, Dallas, TX (US); Sthanunathan Ramakrishnan, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 921 days.

(21) Appl. No.: 13/901,777

(22) Filed: May 24, 2013

(65) Prior Publication Data

US 2014/0185472 A1    Jul. 3, 2014

Related U.S. Application Data

(60) Provisional application No. 61/747,739, filed on Dec. 31, 2012.

(51) Int. Cl.
*H04W 4/02* (2009.01)
*H04W 4/04* (2009.01)

(52) U.S. Cl.
CPC .......... *H04W 4/023* (2013.01); *H04W 4/043* (2013.01)

(58) Field of Classification Search
None
See application file for complete search history.

(56) References Cited

U.S. PATENT DOCUMENTS 8,238,268 B1 * 8/2012 Shmidt ........................ 370/254
8,478,298 B1 * 7/2013 Mansour ................. H04W 4/02
                                                 370/248

(Continued)

FOREIGN PATENT DOCUMENTS

JP        2012506207 A    3/2012
WO    WO2012015897 A1    2/2012

OTHER PUBLICATIONS

Search Report for Chinese Patent Application No. 201310731052.1, dated May 23, 2017 (2 pages).

(Continued)

*Primary Examiner* — Hassan Kizou
*Assistant Examiner* — Roberta A Shand
(74) *Attorney, Agent, or Firm* — Gregory J. Albin; Charles A. Brill; Frank D. Cimino

(57) ABSTRACT

A method for incorporating invisible APs for RSSI based indoor positioning is presented. An empirical estimate of the probability of invisible APs versus distance is computed. An estimated position of the receiver can be computed using any statistical estimator based on the probability. In one embodiment, an estimate of the probability is computed by combining the probability over a set of visible APs and the probability over a set of invisible APs with the probability of individual contribution. In one embodiment a dynamic procedure is used to update the invisible probability that is computed using an AP dictionary built on the fly as new APs are detected. Incorporating invisible APs for estimating user position from the RSSI measurements for indoor positioning provides a better positioning accuracy as compared to typical estimators which rely only on the visible APs.

22 Claims, 4 Drawing Sheets

(56) References Cited

U.S. PATENT DOCUMENTS

| | | | | |
|---|---|---|---|---|
| 8,611,887 | B1* | 12/2013 | Okmyanskiy et al. | 455/422.1 |
| 9,213,081 | B2* | 12/2015 | Tarlow | G01S 5/0257 |
| 2009/0103503 | A1* | 4/2009 | Chhabra | H04W 48/20 |
| | | | | 370/338 |
| 2010/0103844 | A1* | 4/2010 | Kim | H04W 48/16 |
| | | | | 370/254 |
| 2010/0226279 | A1* | 9/2010 | Georgis | H04W 64/00 |
| | | | | 370/254 |
| 2011/0110338 | A1* | 5/2011 | Khoryaev | G01S 5/0215 |
| | | | | 370/335 |
| 2011/0269452 | A1* | 11/2011 | Roumeliotis et al. | 455/424 |
| 2012/0108259 | A1* | 5/2012 | Weiss | 455/456.1 |
| 2012/0315918 | A1* | 12/2012 | Kadous | 455/456.1 |
| 2013/0023284 | A1* | 1/2013 | Stanger | 455/456.1 |
| 2013/0115972 | A1* | 5/2013 | Ziskind et al. | 455/456.2 |
| 2013/0165144 | A1* | 6/2013 | Ziskind | H04W 4/02 |
| | | | | 455/456.1 |
| 2013/0344859 | A1* | 12/2013 | Abramson et al. | 455/418 |
| 2014/0106773 | A1* | 4/2014 | Li | 455/456.1 |
| 2014/0185518 | A1* | 7/2014 | Ramakrishnan | H04W 4/023 |
| | | | | 370/328 |

OTHER PUBLICATIONS

JP2012506207, Machine English Translation, dated Aug. 17, 2017 (19 pages).

* cited by examiner

METHOD FOR INCORPORATING INVISIBLE ACCESS POINTS FOR RSSI-BASED INDOOR POSITIONING APPLICATIONS

The present application claims priority from U.S. Provisional Application No. 61/747,739, filed Dec. 31, 2012, the entire disclosure of which is incorporated herein by reference.

BACKGROUND

The present invention relates to indoor positioning systems, in particular, improving the indoor positioning accuracy by exploiting invisible Access Points (APs).

Indoor positioning implies to wirelessly locating objects or people inside buildings. Indoor positioning has many applications in the context of commercial, personal, entertainment, health, such as locating a particular store in a mall or finding a conference room inside an office building, etc. Global Positioning System (GPS) is a widely used positioning solution, which is generally not suitable for establishing indoor locations due to signal attenuation caused by building materials and also multi-path propagation caused by surface reflections.

In indoor environments or in the dense urban canyons, where the low level satellite based signals are critically compromised by obscuration and environmental degradation, Wi-Fi based positioning systems are gaming popularity. Wi-Fi hotspots are prevalent in the very areas where GPS starts to struggle and many smart devices are already equipped with Wi-Fi technology that can support positioning applications. Wi-Fi is a mechanism that allows an electronic device to exchange data wirelessly over a computer network. A Wi-Fi enabled device such as a smart phone, a personal computer, a tablet or a video game console can connect to a network resource such as the internet via a wireless network AP. An AP or a hotspot has a range of about 20 meters indoors and a greater range outdoors. Hotspot coverage can comprise an area as small as a single room with walls that block radio signals or as large as many square miles, covered by multiple overlapping APs. A conventional Wi-Fi communication system is explained with the help of FIG. 1.

FIG. 1 illustrates a conventional Wi-Fi communication system 100.

As illustrated in the figure, conventional Wi-Fi communication system 100 includes a user device 102, and an AP database 104. Assuming user device 102 is located at a position (x,y), which needs to be determined. A first AP 106 is located at a position $(x_1,y_1)$, a second AP 108 is located at a position $(x_2,y_2)$, a third AP 110 is located at a position $(x_3,y_3)$ and an i-th AP 112 is located at a position $(x_1,y_1)$. Assuming the distance between user device 102 and AP 106 is $d_1$, the distance between user device 102 and AP 108 is the distance between user device 102 and AP 110 is and the distance between user device 102 and AP 112 is $d_1$. User device 102 communicates with AP 106-112 via a Wi-Fi communication channel 114 and with AP database 104 via a communication channel 116.

AP database 104 contains the location of APs and is managed by a database vendor such as Google, Navizon and so forth. Generally, a database vendor collects the location of APs by "wardriving" efforts and builds up their database from information collected from multiple users at different times.

Location of user device 102 can be determined based on the locations of AP 106-112. Suppose, user device 102 is a Wi-Fi enabled mobile phone. In one example, user device 102 will scan all APs (for example, AP 106-112) in its vicinity by sending a probe request to all the APs. Typically, an AP will respond with a probe response, which includes the Media Access Control (MAC) address for that AP and some other information regarding the capabilities of that AP. A MAC address is a unique identifier assigned to network interfaces for communications on the physical network segment and will uniquely identify that AP.

User device 102 receives MAC address from AP 106-112 and looks up AP database 104 to get the approximate location of each AP. Once user device 102 has approximate locations for AP 106-112, it can determine its location based on the Receive Signal Strength Indicator (RSSI) for each AP. The received signal, power of an AP may be in terms of dBm (decibels above a reference level of one milliwatt), which indicates how far the AP is from user device 102. For example, if the signal power is really high, it's an indication that AP is really close by. On the other hand, low signal power indicates that the AP is really far away. Based on this information, the approximate location of user device 102 can be easily determined in a conventional Wi-Fi positioning system 100.

The propagation model for Wi-Fi communication channel 114 is usually approximated by the log normal shadowing model. Shadowing is the effect that the received signal power fluctuates due to objects obstructing the propagation path between a transmitter and a receiver. Log normal shadowing model captures effects caused by imperfect antennas and environmental obstruction. Power received from i-th AP 112 in dB can be expressed as:

$$R_i(\text{dB}) = \alpha_i + 10 n_i \log_{10}(d_0/d_i) + w, \quad (1)$$

where $d_0$ is a reference fixed distance from AP 112 (typically less than 2 m), n is the path loss exponent, $\alpha_i$ is the reference power at distance $d_{ij}$ and w is a zero-mean white Gaussian noise with variance $\sigma^2$. The path loss exponent depends on the specific propagation environment and indicates the rate at which the path loss increases with distance.

Given the position of user device 102 as (x,y) and the position of i-th AP 112 as $(x_i,y_i)$, the distance $d_i$ is computed as:

$$d_i = \sqrt{(x-x_i)^2 + (y-y_i)^2}. \quad (2)$$

If the different RSSI measurements are independent, the joint distribution is a multivariate Gaussian with a diagonal covariance matrix, i.e., the RSSI measurements are distributed as $$p(\underline{R}|x,y) \sim N(\underline{\mu}, \sigma_i^2 I). \quad (3)$$

where $\underline{R}$ is the Gaussian distribution and $\underline{\mu}$, is the mean vector with $$\mu_i = \alpha_i + 10 n_i \log_{10}(d_0/d_i), \quad (4)$$

and I is the identity matrix.

The objective of RSSI based indoor positioning is to estimate the position of a user (x,y) from the RSSI measurements ($R_i$). A typical receiver uses an estimation algorithm, for example, the maximum likelihood estimator to find the most likely position (x,y) that maximizes the probability p of vector R, given x and y, i.e., $p(\underline{R}|x,y)$.

Conventional Wi-Fi positioning system 100 exploits only visible APs to the receiver each time. If an AP exists in AP database 104 but it does not show up in scanning, a possibility is that the AP is far from the receiver, i.e., the AP is invisible to the receiver. The visible APs usually represent a small percentage of all available APs due to the receiver sensitivity. Receiver sensitivity implies a minimum level of available RF energy (above the background noise level), so that a bit stream can be extracted. Generally, the receivers cannot detect distant APs with very small received powers. However, these APs carry useful information that could be exploited to improve the positioning accuracy.

What is needed is a method for improving the positioning accuracy for RSSI based positioning systems.

BRIEF SUMMARY

The present invention provides a system and method for incorporating invisible APs for improving the positioning accuracy for RSSI based positioning systems.

In accordance with an aspect of the present invention, a device is provided for use with a first access point, a second access point and a third access point, first location information based on a geodetic location of the first access point, second location information based on a geodetic location of the second access point, and third location information based on a geodetic location of the second access point, the first access point being operable to provide first distance information, the second access point being operable to provide second distance information. The device includes a scanning module, a distance calculating portion and a position estimator. The scanning module can receive the first location information, the second location information, the third location information, the first, distance information and the second distance information. The distance calculating portion can calculate a first distance based on the first distance information and can calculate a second distance based on the second distance information. The position estimator can estimate a position of the device based on the first distance, the second distance and the third location information.

Additional advantages and novel features of the invention are set forth in part in the description which, follows, and in part will become apparent to those skilled in the art upon examination of the following or may be learned by practice of the invention. The advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention, in the drawings.

DETAILED DESCRIPTION

Aspects on the invention incorporate invisible APs for estimating user position from the RSSI measurements for indoor positioning. Certain APs exist in the AP database but are not detected in scanning due to being distant from the receiver. These APs carry useful information that can be used for estimating a more accurate positioning as compared to just using visible APs. In one embodiment of the invention, for a baseline channel model a fixed probability distribution is used to determine the invisible probability. One embodiment of the invention uses an enhanced implementation, where a dictionary of APs is built up dynamically that is used in the search of invisible APs. In one embodiment of the invention, a dynamic procedure is used to update the invisible probability with the help of estimated receiver position. Since the distance a signal can travel before being detected depends very much on the path loss exponent that can change from one environment to another, invisible probability varies with environment as well, which needs to be dynamically updated.

Considering a scenario with a few visible APs and a few invisible APs in the vicinity of a receiver, as explained below with the help of FIGS. 2A-2B.

Figure 2A:
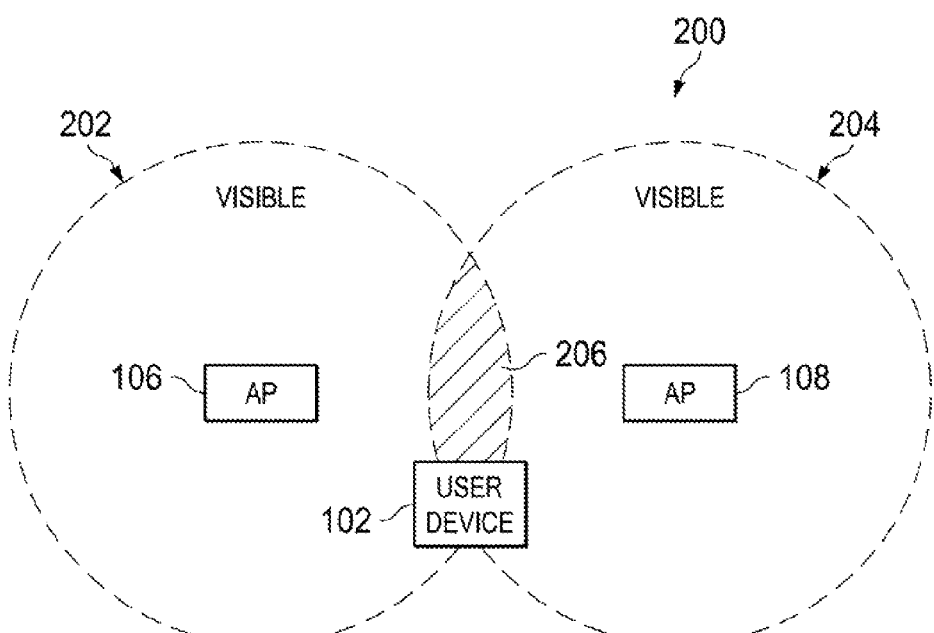
FIGS. 2A-2B illustrate a set of visible and invisible APs in the vicinity of a user device.

FIG. 2A illustrates a set of visible APs in the vicinity of a user device.

As illustrated in the figure, user device 102 is at a certain distance from visible APs 106 and 108, as indicated by their distance circles 202 and 204 respectively.

Figure 1:
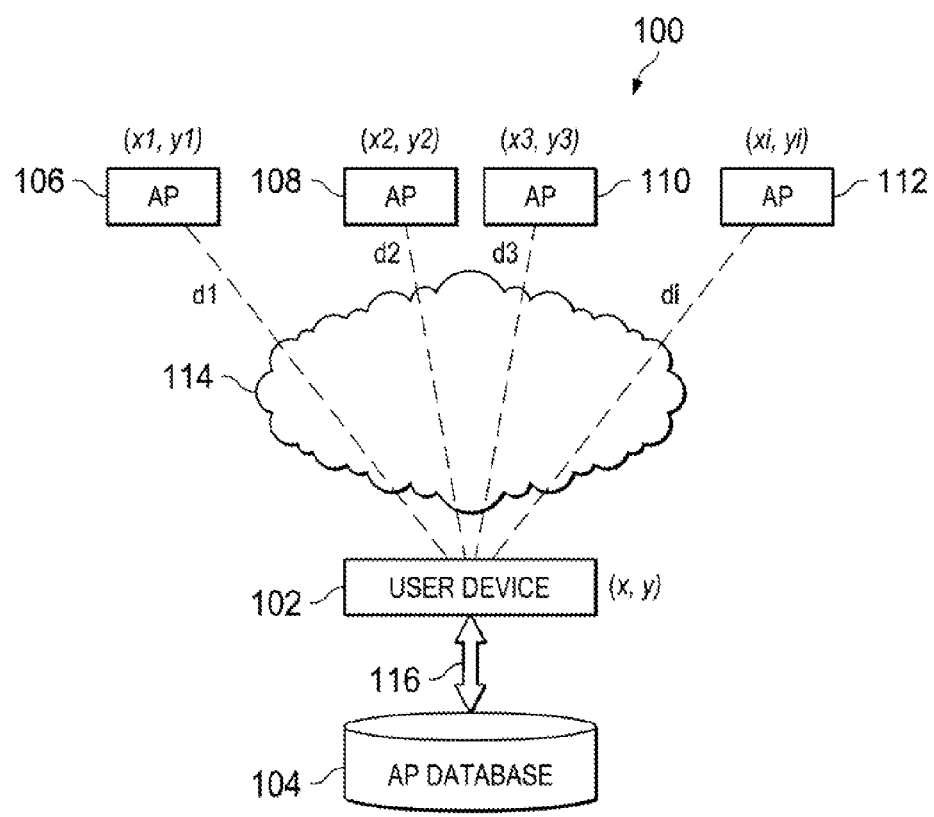
FIG. 1 illustrates a conventional Wi-Fi communication system.

As discussed with reference to FIG. 1 in conventional systems, location of user device 102 can be determined using an AP database and the signal strength (RSSI) of the AP signals. Distance circles 202 and 204 indicate the range of the signal strength for APs 106 and 108 beyond which a receiver cannot easily detect the received signal from APs 106 and 108.

In one example, location of a user device can be determined based on the common area where the distance circles of different APs overlap. As illustrated in FIG. 2A, a common area 206 indicates the intersection of distance circles 202 and 204, from which the approximate location of user device 102 can be calculated. Note that APs 106 and 108 are visible to user device 102 since user device 102 is within the distance circles of APs 106 and 108 and able to detect the signals received from them. There may be some invisible APs in the vicinity of user device 102 as well, which may exist in the AP database but being far from user device 102 may not show up in scanning. This is illustrated with the help of FIG. 2B.

Figure 2B:
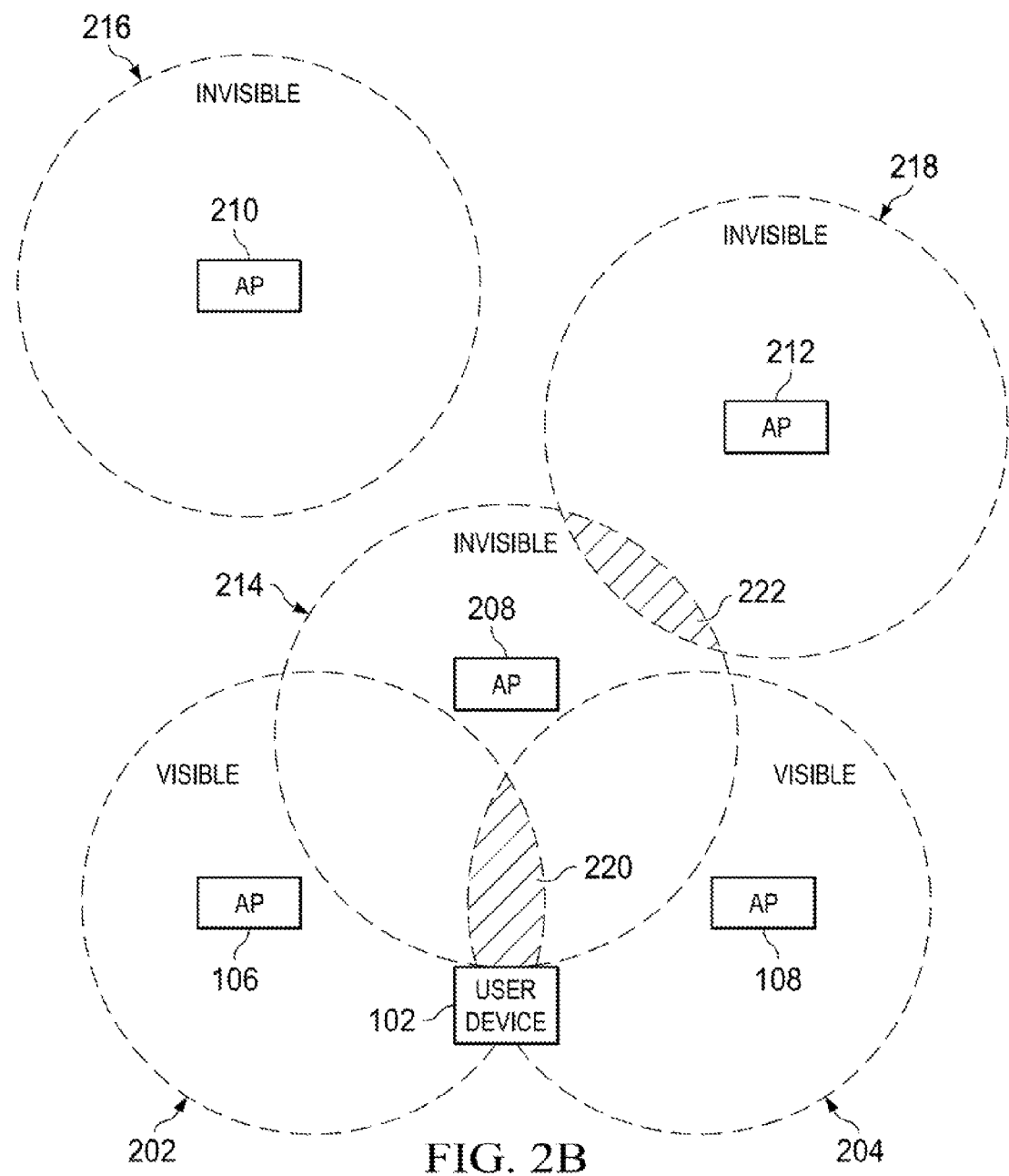

As illustrated in FIG. 2B, user device 102 is at a certain distance from visible APs 106 and 308. An AP 208, an AP 210 and an AP 212 are far from user device 102 and hence are invisible APs.

A distance circle 216 for AP 210 does not overlap with any other distance circle from other APs and may not show up in scanning for APs. A distance circle 218 for AP 212 overlaps with another invisible AP 208, as shown by an overlapping area 222; however, it does not overlap with any of the visible APs. In one embodiment of the invention, user device 102 is not able to detect AP 210 and AP 212 due to the small receiver powers from these APs and, therefore, does not consider AP 210 and AP 212 for positioning.

In one embodiment of the invention, invisible AP 208 may be considered for positioning of user device 102 even though AP 208 does not show up in scanning. A distance circle 214 of AP 208 intersects with overlapping area of distance circles 202 and 204 for visible APs 106 and 108. This intersection of distance circles for invisible AP 208, and visible APs 106 and 108, as indicated by an area 220, represents a better positioning estimate for user device 102 as compared to FIG. 2A. User device 102 is able to extract useful information from the packet received from AP 208 and use it along with information received from visible APs 106 and 108 for more accurate positioning estimate. In this example, user device 102 is able to determine its geodetic location to be somewhere within area 206 that does not include the area 220.

As illustrated with reference to FIGS. 2A-2B, certain invisible APs can be considered for estimating the user position in order to improve the positioning accuracy. The present invention proposes different embodiments for determining the probability of having invisible APs at a certain distance from the receiver and incorporating the information received from visible and invisible APs to have a better estimate of the receiver position.

In one embodiment of the invention, the first step to incorporate the invisible APs is to have an empirical estimate of the probability of missing the AP versus distance. This probability could be computed, for example, from field experiments. A typical behavior with reference to miss probability is explained with the help of FIG. 3.

Figure 3:
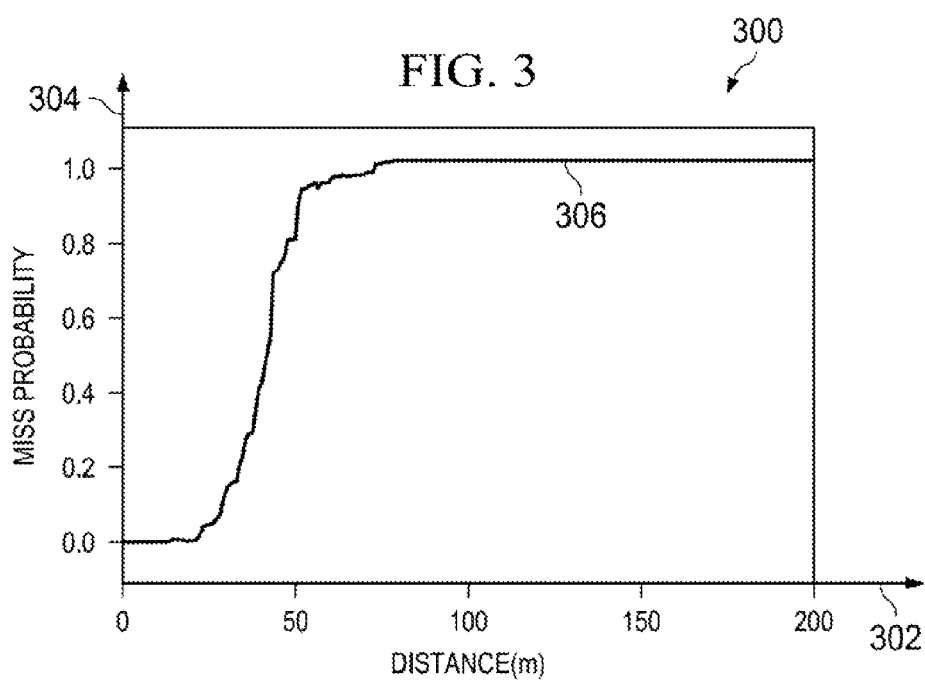
FIG. 3 illustrates a graph for miss probability versus distance.

FIG. 3 illustrates a graph for miss probability versus distance.

As illustrated in a graph 360, an x-axis 362 represents the distance (in meters) between the AP and the receiver, and a y-axis 304 represents the probability of having invisible APs at a certain distance.

As illustrated by a curve 306, the miss probability is almost zero when the distance between the AP and the receiver is less than 25 meters, indicating that most of the APs will be visible if they are within 25 meters distance from the receiver. Furthermore, the miss probability is one when the distance between the AP and the receiver is about 80 meters or more, indicating that most of the APs will be invisible if they are 80 meters or more away from the receiver. As illustrated by curve 306, as the distance between the AP and the receiver increases from 25 meters to 80 meters, the probability of having invisible APs increases. It should be noted that example curve 306 is only provided for purposes of discussion and it is dependent on the indoor environment.

As an example, for a set V of visible APs and a set $\overline{V}$ of invisible APs, if the probability of not seeing or missing an AP is denoted as $p(\overline{V}|d)$, the probability $p(V|d)$ of seeing or detecting an AP is its complement, which is represented as:

$$p(V|d)=1-p(\overline{V}|d). \quad (5)$$

For each, possible position $\underline{u}=(x,y)$, a typical likelihood function could be computed as:

$$P(\underline{R}|\underline{u}) = \prod_{i \in V} P(R_i|\underline{u}), \quad (6)$$

where R is a vector of RSSI reading for each AP. For maximum likelihood estimation, $\underline{u}$ with maximal, value is selected as estimated position.

In one embodiment, of the invention, an estimation of the probability is determined by combining the probability over a set of visible APs and the probability over a set of invisible APs with the probability of individual contribution. The estimation procedure may be maximum likelihood or maximum mean square or any known estimation method known in the art.

In one embodiment of the invention, a following likelihood function is computed:

$$P(\underline{R}|\underline{u}) = \prod_{i \in V} P(R_i|\underline{u})P(V_i|\underline{u}) \prod_{j \in \overline{V}} P(\overline{V}_j|\underline{u}), \quad (7)$$

where $p(V_i|\underline{u})$ is the probability that the i-th AP in V is visible at the particular position $\underline{u}$, which depends on the distance between $\underline{u}$ and the i-th visible AP. Similarly, $p(\overline{V}_j|\underline{u})$ denotes the probability that the j-th AP in $\overline{V}$ is invisible at the particular position u, which also depends on the distance between $\underline{u}$ and the j-th invisible AP.

Note that the use of maximum likelihood estimation is for illustrative purposes only. In fact, any statistical estimator may be used in similar fashion. The number of invisible APs to include in the estimation process is arbitrary and depends in general on the available resources.

The invisible probability calculation, as discussed with reference to FIG. 3, is for a baseline channel model using a fixed probability distribution. In this case, all the APs in the database whose locations are known can be used for the search of invisible APs.

One embodiment of the invention suggests enhanced implementation, which allows dynamic buildup of a dictionary of APs that is used in the search for invisible APs. An AP is added to the dictionary only if it has been detected at least once. This procedure aims at reducing the false alarms that may be caused by aiming off an AP that, is listed in the database.

Furthermore, in one embodiment of the invention, the invisible probability is updated using the same idea of an estimated position in a dynamic procedure. In this case, a dynamic counter keeps track of the number of times a receiver has been at a particular distance d from an AP (visible or invisible) in the database. Another counter keeps track of the number of times the receiver has been at distance d from an invisible AP. The updated invisible probability at distance d is simply the ratio of the two counters. A system for determining the invisible probability is explained further with the help of FIG. 4.

Figure 4:
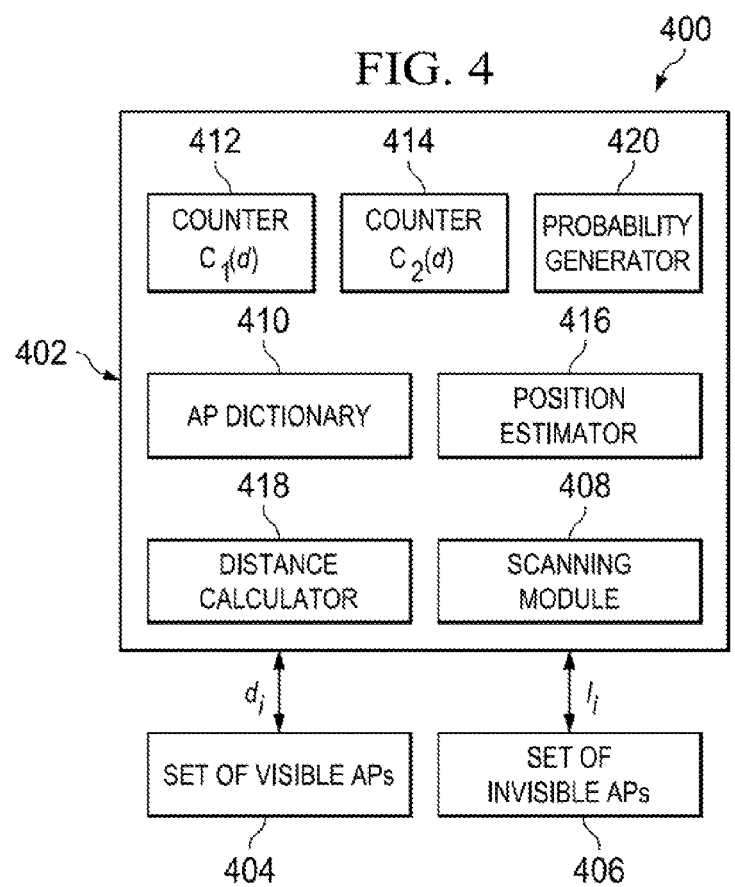
FIG. 4 illustrates an example embodiment of a system incorporating invisible APs for RSSI based indoor positioning, in accordance with an aspect of the invention.

FIG. 4 illustrates an example embodiment of a system incorporating invisible APs for RSSI based indoor positioning, in accordance with an aspect of the invention.

As illustrated in the figure, a system 400 includes a receiver 402, which further includes a scanning module 408, an AP dictionary 410, a counter 412, a counter 414, a position estimator 416, a distance calculator 418 and a probability generator 420. In this example, scanning module 408, AP dictionary 410, counter 412, counter 414, position estimator 416, distance calculator 418 and probability generator 420 are distinct elements. However, in some embodiments, at least two of scanning module 408, AP dictionary 410, counter 412, counter 414, position estimator 416, distance calculator 418 and probability generator 420 may be implemented as a computer having stored therein tangible computer-readable media for carrying or having computer-executable instructions or data structures stored thereon. Such tangible computer-readable media can be any available media that can be accessed by a general purpose or special purpose computer. Non-limiting examples of tangible computer-readable media include physical storage and/or memory media such as RAM, ROM, EEPROM, CD-ROM or other optical disk storage, magnetic disk storage or other magnetic storage devices, or any other medium which can be used to carry or store desired program code means in the form, of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a tangible computer-readable medium. Combinations of the above should also be included within the scope of tangible computer-readable media.

Receiver 402 can communicate with APs, represented as a set of visible APs 404 and a set of invisible APs 406 for illustrative purposes. The distance between an i-th visible AP and the receiver is denoted as $d_i$ and the distance between an i-th invisible AP and the receiver is denoted as $l_i$.

Scanning module 408 is operable to scan the APs in the vicinity of receiver 402. Scanning module 408 is able to receive location information of each AP, for example from a conventional AP database that provides geodetic location information of each AP. Scanning module 408 is additionally able to receive distance information from each AP, within a receiving distance, for example, in one embodiment, scanning module 408 sends a probe request to each AP, which responds with a MAC address and RSSI as part of the probe response.

AP dictionary 410 is initially empty and built on the fly as new APs are detected. When a new AP is detected, a probe request is sent to that AP to get its location. A visible AP, which is already not part of the database, is added to AP dictionary 410.

Counter 412 is operable to keep track of the number of times receiver 402 has been at a particular distance d from an AP within set of visible APs 404 and set of invisible APs 406. Initial value for counter 412 is set at an arbitrary large value $\Omega$, i.e., $C_1(d)=\Omega$.

Counter 414 is operable to keep track of the number of times receiver 402 has been at a particular distance d from, an AP within set of invisible APs 406. Counter 414 is initialized by multiplying $\Omega$ with initial invisible probability at distance d, i.e., $C_2(d)=\Omega \cdot p(\overline{V}|d)$.

Position estimator 416 is able to estimate the position of receiver 402, based on the distances from each AP. Position estimator 416 is further operable to estimate the position of receiver 402 as the APs are added to AP dictionary 410. It should be noted that an "estimated" user position is used for updating the probability in the event the exact position is not known, i.e., blind learning.

Distance calculator 418 is a distance calculating portion that is able to calculate a distance from receiver 402 to an AP. In an example embodiment, the calculated distance is based on the distance information from that AP. In a more specific embodiment, the calculated distance from receiver 402 to an AP is based on the RSSI of that AP, wherein the AP sends a packet to receiver 402, from which receiver 402 measures the RSSI. For example, distance calculator 418 is operable to calculate distance $d_i$ between the estimated receiver position and each i-th visible AP. For each $d_i$, counter 412 is incremented, i.e., $C_1(d_i)=C_1(d_i)+1$.

Distance calculator 418 is further operable to calculate distance $l_i$ between the estimated receiver position and each i-th invisible AP. For each $l_i$, counter 412 is incremented, i.e., $C_1(l_i)=C_1(l_i)+1$ and counter 414 is incremented, i.e., $C_2(l_i)=C_2(l_i)+1$.

Probability generator 420 is operable to generate invisible probability as:

$$P(\overline{V}|d) = \frac{C_2(d)}{C_1(d)} \qquad (8)$$

In one embodiment, a median function is performed on the new probability curve to have a smooth probability density function, for example, in metlab notation it can be represented as:

$$P(\overline{V}|d)=\text{median}(P(\overline{V}|d-2:d+2)). \qquad (9)$$

In one embodiment, small and big values of probability are clipped to limit the probability within the range of $[10^-,0.999]$. Accordingly, distance calculator 418 is operable to calculate distance $d_i$ between the estimated receiver position and each i-th visible AP based on the probability vector.

Figure 5:
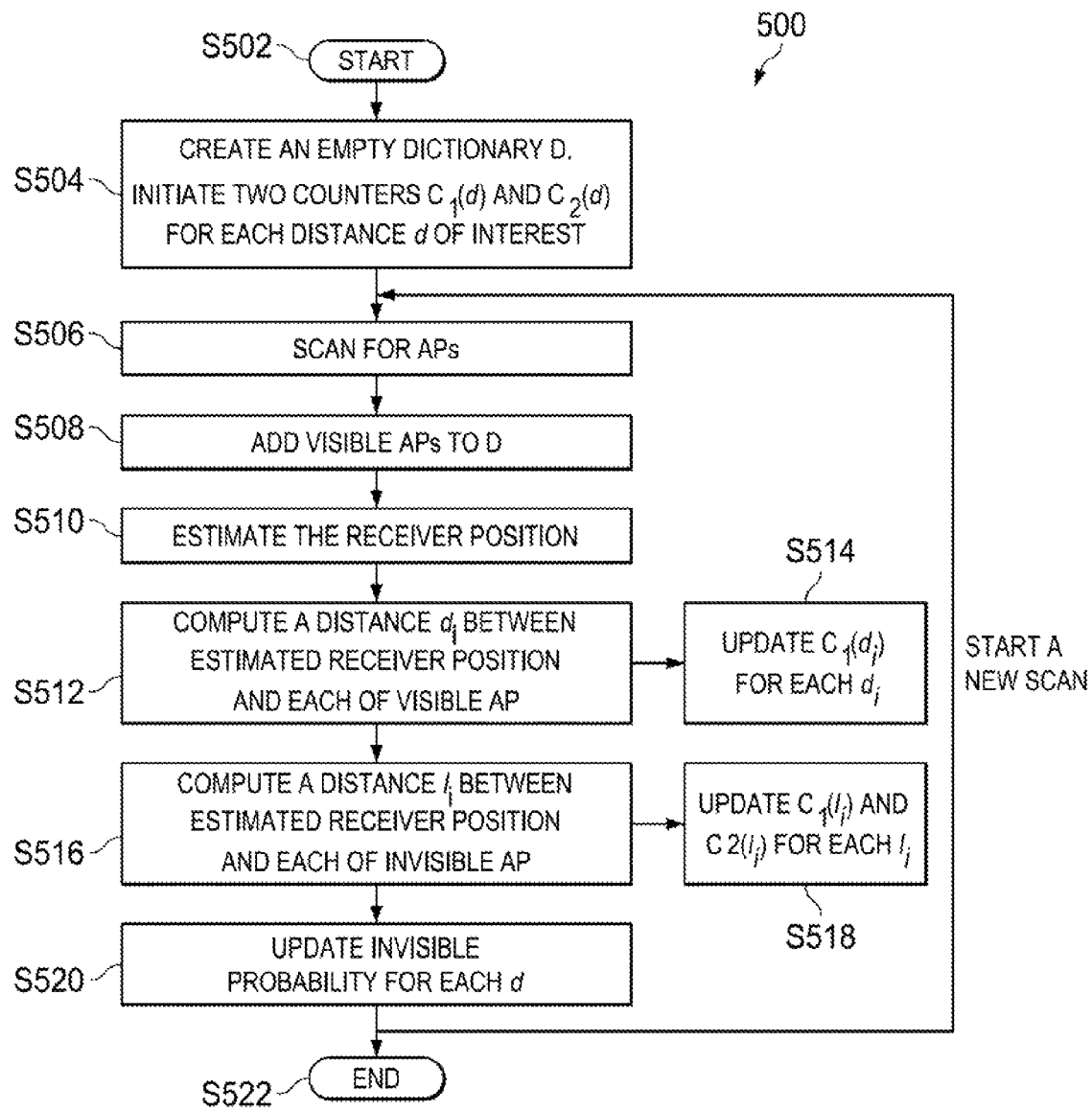
FIG. 5 illustrates a process for incorporating invisible APs for RSSI based indoor positioning, in accordance with an aspect of the invention.

An example process for incorporating invisible APs for RSSI based indoor positioning is explained further with the help of FIG. 5.

FIG. 5 illustrates a process for incorporating invisible APs for RSSI based indoor positioning, in accordance with an aspect of the invention.

A process 500 starts when the location of a receiver needs to be determined in the vicinity of a number of APs (S502).

AP dictionary 410 is created for building the database on the fly as the APs are detected. An AP that has been detected at least once in the AP database is added to AP dictionary 410. Further, counters $C_1(d)$ and $C_2(d)$ are initialized by counter 412 and counter 414 respectively (S504).

Scanning module 408 searches for APs (S506). When a new MAC address is found, scanning module 408 sends a query to get the position of the AP for adding to the database.

At each new scan, visible APs, which do not already exist in AP dictionary 410, are added to AP dictionary 410 (S508). As an example, after first scan AP 106 and 108 may be added to AP dictionary 410.

Position estimator 416 determines an estimation of the receiver position (S510). Referring back to FIG. 2B, position of user device 102 is estimated using the information received from APs 106 and 108.

Distance calculator 418 computes the distance $d_i$ between the estimated receiver position and each of the visible APs (S512). For example, distance $d_1$, between user device 102 and visible AP 106 is calculated. Similarly, distance $d_2$ between user device 102 and visible AP 108 is calculated.

Counter 412 updates $C_1(d_i)=C_1(d_i)+1$ for each $d_i$ (S514).

Distance calculator 418 computes the distance $l_i$ between the estimated receiver position and each of the invisible APs (S516). Referring back to FIG. 2B, a distance $l_i$ between invisible AP 208 and user device 102 is calculated. Note that in the example embodiment of FIG. 2B, user device 102 is not able to detect invisible APs 210 and 212, and therefore, APs 210 and 212 are not considered for estimating the position of user device 102.

Counter 412 updates $C_1(l_i)=C_1(l_i)+1$ and counter 414 updates $C_2(l_i)=C_2(l_i)+1$ for each $l_i$ (S518).

Probability generator 420 updates invisible probability for each distance d as $$P(\overline{V}|d) = \frac{C_2(d)}{C_1(d)} (S520).$$

The process ends (S522) unless a new scan is started (S506).

As discussed with reference to FIGS. 4-5, an AP database is built on the fly as new APs are detected. The invisible probability is computed dynamically using the estimated position of the receiver from the visible and invisible APs. Note that of all the detected invisible APs, only the invisible APs which are contributing to the estimation are considered.

It should be noted that the example embodiments discussed above estimate a position of the receiver in a two dimensional fashion, e.g., in (x,y) coordinates. However, aspects of the embodiment may additionally include estimating a position of the receiver in a three dimensional fashion, e.g, in (x,y,z), in a similar manner.

In one aspect of the invention, estimated position of the receiver is computed based on the probability that an AP from a set of visible APs is visible at a particular position depending on the distance between the receiver and the visible AP and also on the probability that an AP from a set of invisible APs is invisible at a particular position depending on the distance between the receiver and the invisible AP. An estimate of the probability is determined by combining the probability over a set of visible APs and the probability over a set of invisible APs with the probability of individual contribution. All the APs in the database are accessed in searching for invisible APs.

In another aspect of the invention, a dictionary of APs is built dynamically that is used in search for invisible APs. An AP is added to the dictionary only if it has been detected at least once. First, the position of the receiver is estimated and the distance between the estimated position and all the APs (visible and invisible) is computed. This estimated position is used to update the invisible probability. One histogram (counter) accounts for the distance from all visible and invisible APs. Another histogram accounts for the distance from alt invisible APs. The updated probability is the ratio of two histograms at each particular distance.

In another aspect of the invention, the probability is not updated, in some situations an original fixed probability is used to determine position.

It should be noted that the example embodiment discussed above with reference to FIG. 2B is based on determining position based on five APs. However, it is apparent that any number of visible and/or invisible APs may be used.

Incorporating invisible APs for estimating user position from the RSSI measurements for indoor positioning provides a better positioning accuracy as compared to typical estimators which rely only on the visible APs.

The foregoing description of various preferred embodiments of the invention have been presented for purposes of illustration and description, it is not intended to be exhaustive or to limit the invention to the precise forms disclosed, and obviously many modifications and variations are possible in light of the above teaching. The example embodiments, as described above, were chosen and described in order to best explain, the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A wireless communication device for use with a plurality of access points, the wireless communication device comprising:
   a scanning module operable to scan for access points and to receive a communication packet from each access point that is detected by the scanning module; and
   a position estimator operable to estimate a position of the wireless communication device based on information in the communication packets received from each access point that is detected by the scanning module and further based on location information pertaining to an access point that was not detected by the scanning module, wherein the location information pertaining to the access point that was not detected is retrieved from a database including location information of the access points.

2. The wireless communication device of claim 1, wherein the communication packet received from each detected access point by the scanning module includes location information pertaining to the access point that transmitted the corresponding communication packet, and wherein the position estimator is operable to estimate a position of the wireless communication device based in part on the location information pertaining to the access points that transmitted the corresponding communication packets.

3. The device of claim 1, wherein the communication packet received from each detected access point includes distance information related to a distance between the wireless communication device and the access point that transmitted the corresponding communication packet, the wireless communication device further comprising:
   a distance calculating portion operable to calculate a distance between the wireless communication device and each access point from which a communication packet was received based on the distance information in each received communication packet, and
   wherein the position estimator is operable to estimate the position of the wireless communication device based on the calculated distances and the location information pertaining to an access point that was not detected by the scanning module.

4. The wireless communication device of claim 3, wherein the distance calculating portion is operable to calculate the distance between the wireless communication device and an access point from which a communication packet was received based on a received signal strength indicator included in the distance information included in the communication packet received from the corresponding access point.

5. The wireless communication device of claim 3, wherein the distance calculating portion is operable to calculate the distance between the wireless communication device and an access point from which a communication packet was received based on a probability vector.

6. The wireless communication device of claim 3, further comprising a probability generating portion operable to receive location information pertaining to the access points detected by the scanning module and to generate a probability vector based on a position of the wireless communication device and the location information pertaining to at least one detected access point.

7. The wireless communication device of claim 6, wherein the distance calculating portion is operable to calculate the distance between the wireless communication device and an access point from which a communication packet was received based on the probability vector.

8. The wireless communication device of claim 1, further comprising an access point dictionary portion operable to store location information pertaining to access points listed in the access point dictionary portion.

9. The wireless communication device of claim 8, further comprising a probability generating portion operable to generate a probability vector based on a position of the wireless communication device and the location information pertaining to at least one access point detected by the scanning module.

10. The wireless communication device of claim 1, further comprising a probability generating portion operable to generate a probability vector based on a position of the wireless communication device and location information pertaining to at least one access point detected by the scanning module.

11. The wireless communication device of claim 1, further comprising a probability generating portion operable to generate a probability vector based on a position of the wireless communication device and location information pertaining to an access point that was not detected by the scanning module.

12. A method of operating a wireless communication device, the method comprising:
  scanning, via a scanning module, for access points;
  receiving, via the scanning module, a communication packet from each access point that is detected by the scanning module;
  estimating, via a position estimator, a position of the wireless communication device based on information in the communication packets received from each access point that is detected by the scanning module and further based on location information pertaining to an access point that was not detected by the scanning module, wherein the location information pertaining to the access point that was not detected is retrieved from a database including location information 2 access points.

13. The method of claim 12, wherein the communication packet received from each detected access point includes location information pertaining to the access point that transmitted the corresponding communication packet, and wherein the estimating the position of the wireless communication device is based in part on the location information pertaining to the access points that transmitted the corresponding communication packets.

14. The method of claim 12, wherein the communication packet received from each detected access point includes distance information related to a distance between the wireless communication device and the access point that transmitted the corresponding communication packet, the method further comprising:
  calculating, via a distance calculating portion, a distance between the wireless communication device and each access point from which a communication packet was received based on the distance information in each received communication packet, and
  wherein estimating, via a position estimator, a position of the wireless communication device comprises estimating the position based on the calculated distances and the location information pertaining to an access point that was not detected by the scanning module.

15. The method of claim 14, wherein calculating the distance between the wireless communication device and an access point from which a communication packet was received based on the distance information in each received communication packet comprises calculating the distance based on a received signal strength indicator included in the distance information included in the communication packet received from the corresponding access point.

16. The method of claim 14, wherein calculating the distance between the wireless communication device and an access point from which a communication packet was received based on the distance information in each received communication packet comprises calculating the distance based on a probability vector.

17. The method of claim 14, further comprising:
  receiving, via a probability generating portion, location information pertaining to the access points detected by the scanning module; and
  generating, via the probability generating portion, a probability vector based on a position of the wireless communication device and the location information pertaining to at least one detected access point.

18. The method of claim 17, wherein calculating the distance between the wireless communication device and an access point from which a communication packet was received based on the distance information in each received communication packet comprises calculating the distance based on a received signal strength indicator included in the distance information included in the communication packet received from the corresponding access point.

19. The method of claim 12, further comprising storing, via an access point dictionary portion, location information pertaining to access points listed in the access point dictionary portion.

20. The method of claim 19, further comprising:
  receiving, via a probability generating portion, location information pertaining to the access points detected by the scanning module; and
  generating, via the probability generating portion, a probability vector based on a position of the wireless communication device and the location information pertaining to at least one detected access point.

21. The method of claim 12, further comprising:
  receiving, via a probability generating portion, location information pertaining to the access points detected by the scanning module; and
  generating, via the probability generating portion, a probability vector based on a position of the wireless communication device and the location information pertaining to at least one detected access point.

22. The method of claim 12, further comprising:
  receiving, via a probability generating portion, location information pertaining to the access points detected by the scanning module; and
  generating, via the probability generating portion, a probability vector based on a position of the wireless communication device and the location information pertaining to an access point that was not detected by the scanning module.

* * * * *